United States Patent [19]
Gasami et al.

[11] Patent Number: 5,221,538
[45] Date of Patent: Jun. 22, 1993

[54] ROTATIONAL INJECTION MOLDING MACHINE HAVING A PLURALITY OF COMBINATIONS OF MALE AND FEMALE DIES

[75] Inventors: Shinji Gasami; Shoso Nishida, both of Hiroshima, Japan

[73] Assignees: Japan Steel Works, Ltd., Tokyo; Daikyo Co., Ltd.; Plalead Co., Ltd., both of Hiroshima, all of Japan

[21] Appl. No.: 740,377

[22] Filed: Aug. 5, 1991

[30] Foreign Application Priority Data

Aug. 6, 1990 [JP] Japan .................. 2-208720
Jan. 8, 1991 [JP] Japan .................. 3-12792
Jan. 8, 1991 [JP] Japan .................. 3-12793

[51] Int. Cl.⁵ .................................. B29C 45/14
[52] U.S. Cl. ................................. 425/127; 264/328.7; 264/328.8; 264/328.11; 425/556; 425/572; 425/574; 425/576
[58] Field of Search .............. 425/572, 574, 575, 576, 425/127, 556; 264/328.8, 328.7, 328.11

[56] References Cited

U.S. PATENT DOCUMENTS 4,744,741 5/1988 Glover et al. ................. 425/572

Primary Examiner—Tim Heitbrink
Attorney, Agent, or Firm—Wegner, Cantor, Mueller & Player

[57] ABSTRACT

An injection molding machine for molding hollow plastic products which includes a pair of molds wherein one of the molds is supported rotatably about the center axis thereof a frame of the machine and each of the molds has at least one set having one male die and two female dies arranged on each product plane at an equal distance from an equal angular pitch about the center axis thereof. The rotatable mold is rotated reciprocally between first and second angular positions at each of which a primary molding of a pair of half products and a secondary molding of a complete product are performed simultaneously.

5 Claims, 16 Drawing Sheets

ROTATIONAL INJECTION MOLDING MACHINE HAVING A PLURALITY OF COMBINATIONS OF MALE AND FEMALE DIES

BACKGROUND OF THE INVENTION

1. Field of the Invention

The present invention relates to a rotational injection molding machine which is able to mold at least a pair of half hollow products and a hollow product consisted of a pair of half hollow products combined in an abutted state successively.

2. Description of the Prior Art

Conventionally, there has been proposed an injection molding machine for molding plastic hollow products (See, for instance, Japanese Patent Laid-open publication No. Sho 62-87315). This molding machine has a pair of molds one of which is slidable relative to the other wherein each mold has a pair of male and female dies arranged in a length-wise direction thereof but in an order of arrangement with each other.

In operation, individual half hollow products are molded by positioning the slidable mold at a first position. Next, after opening the pair of molds, the slidable mold is moved to a second position so that the half hollow products thus molded abut each other when the other mold is clamped to the slidable mold. In this state, a secondary molding is produced by supplying molten resin around the butted ends of the half hollow products to connect or merge them with each other.

This molding machine is advantageous in that the primary and secondary injection moldings can be made successively only by sliding the slidable mold.

However, in this molding machine, the injection amount at the secondary injection molding is quite small in comparison with that at the primary injection molding and it becomes necessary to adjust the injection amount at every injection molding so that it is quite difficult to control the injection amount.

Further, since both male dies are maintained in an idle state upon the secondary injection molding in which only female dies are used, the temperature of each male die lowers during the second injection molding process while each female die is maintained at a relatively high temperature. This makes it necessary to compensate for the temperature drop of the male die.

SUMMARY OF THE INVENTION

One of objects of the present invention is to provide an injection molding machine for forming hollow plastic products wherein all dies are used in both the primary and secondary injection moldings so that the temperature of each die may be maintained uniformly.

Another object of the present invention is to provide an injection molding machine for forming hollow plastic products wherein the primary injection molding and the secondary injection molding can be done simultaneously so that the injection amount may be kept constant at every injection molding.

A further object of the present invention is to provide a rotational injection molding machine for forming hollow plastic products wherein one of a pair of molds is rotatable about its center and, accordingly, the injection molding operation can be done only by rotating the rotatable mold around its center without any sliding operation.

In order to achieve these objects, according to the present invention, there is provided an injection molding machine for forming hollow plastic products which comprises a pair of molds, an injection means for injecting a molten resin into one or more cavities formed between said pair of molds and a clamp means for clamping and opening one of said pair of molds to the other mold upon injection molding being characterized in that one of said pair of molds is rotatably supported about a center thereof by a support means, that each of said pair of molds has at least one set consisting of one male die and two female dies arranged on each product molding plane thereof at an equal distance from and an equal angular pitch about the center axis thereof and there is provided a rotation means for rotating said rotatable mold about said center thereof between two angular positions reciprocally whereat each of said male dies of said pair of molds engages with either one of said two female dies of the counter mold and the remaining female dies mate with each other.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which.

DETAILED DESCRIPTION OF THE PREFERRED EMBODIMENTS

Figure 1:
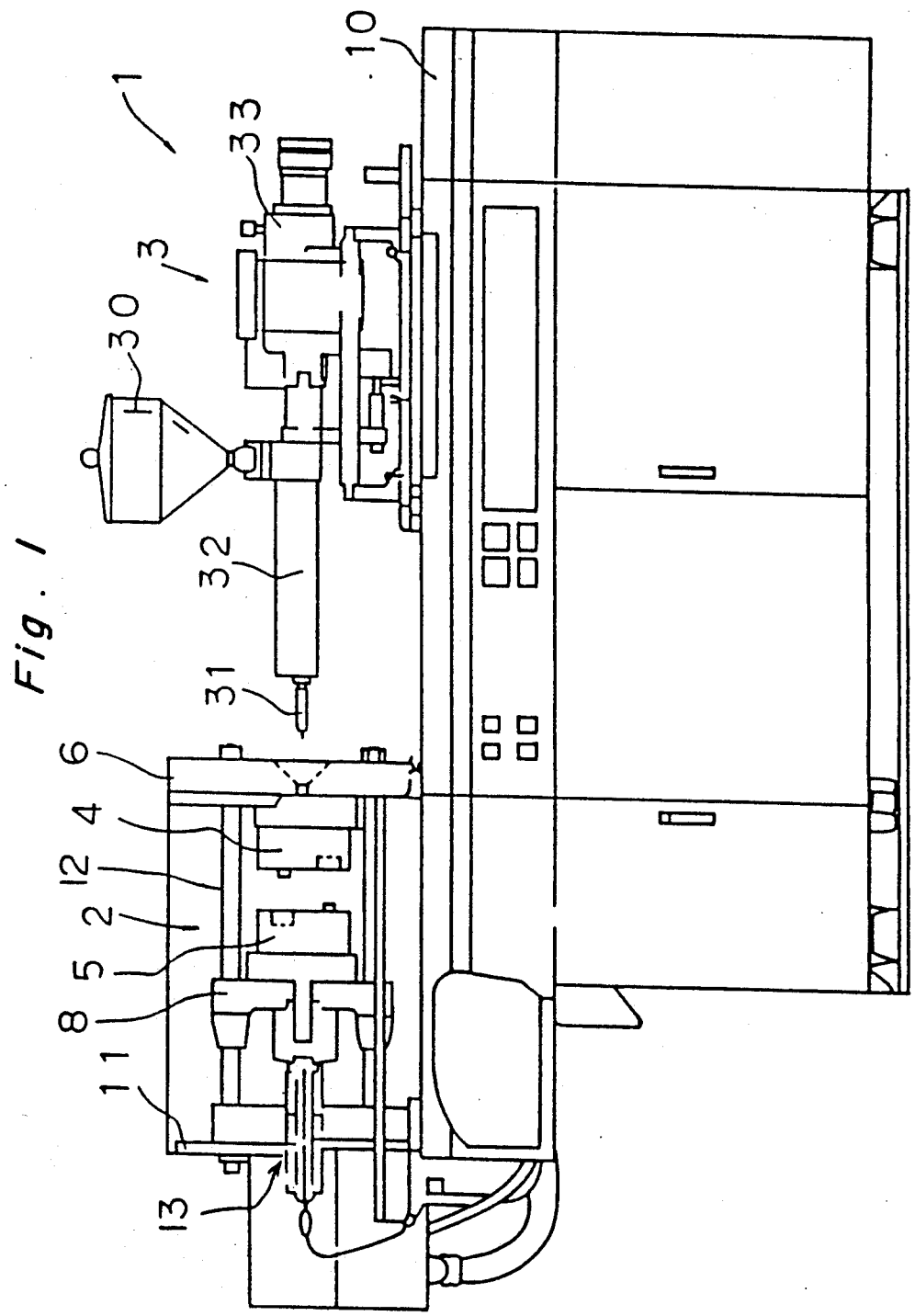
FIG. 1 is a front view of an injection molding machine according to the present invention.

FIG. 1 shows a rotational injection molding machine.

A mount frame 11 is mounted on one side of a bed 10 of the injection molding machine 1. On the mount frame 11, a rotational molding mechanism 2 is supported and, on the other side of the bed there is arranged an injection mechanism 3. The injection mechanism 3 includes a hopper 30 for containing plastic material, a nozzle 31 for injecting molten resin, a pressurizing cylinder 32 and a driving apparatus 33 for moving the injection nozzle 31 to and fro against the rotational molding mechanism 2.

Figure 2:
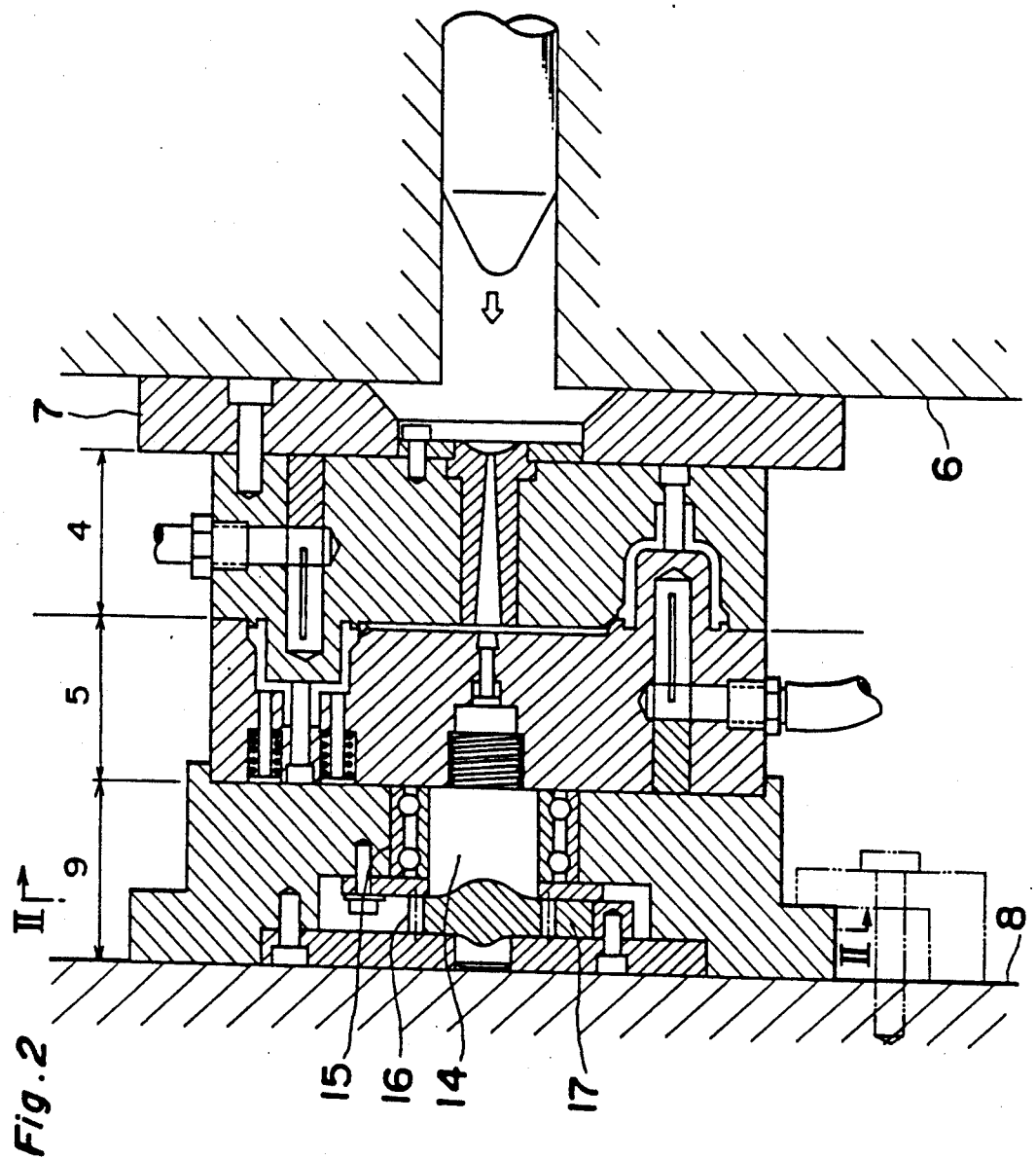
FIG. 2 is a cross-sectional view of a pair of molds in a clamped state, FIG. 3 if a schematic cross-sectional view along II—II line of FIG. 2 for showing a rotation mechanism for rotating a rotatable mold.

FIG. 2 shows a concrete structure of the rotational molding mechanism 2.

The rotational molding mechanism 2 essentially includes a fixed metal mold 4 and a rotatable metal mold 5. The fixed mold 4 is mounted on a fixed platen 6 forming a part of the mounting frame 11 by a mounting plate 7.

The rotatable mold 5 is supported by a movable platen 8 via a mounting plate 9. As shown in FIG. 1, the movable platen 8 is movably guided by a plurality of guide rods 12 and is driven by a suitable driving means 13 such as a hydrodynamical cylinder for clamping and releasing the rotatable mold 5 against and from the fixed mold 4.

As shown in FIG. 2, the rotatable mold 5 is fixedly supported at its center by a rotational shaft 14 which is rotatably supported by a bearing means 15 supported by the mounting plate 9. The rotational shaft 14 has a pinion 16 at the end thereof remote from the rotatable mold 5 which engages a rack 17.

Figure 3:
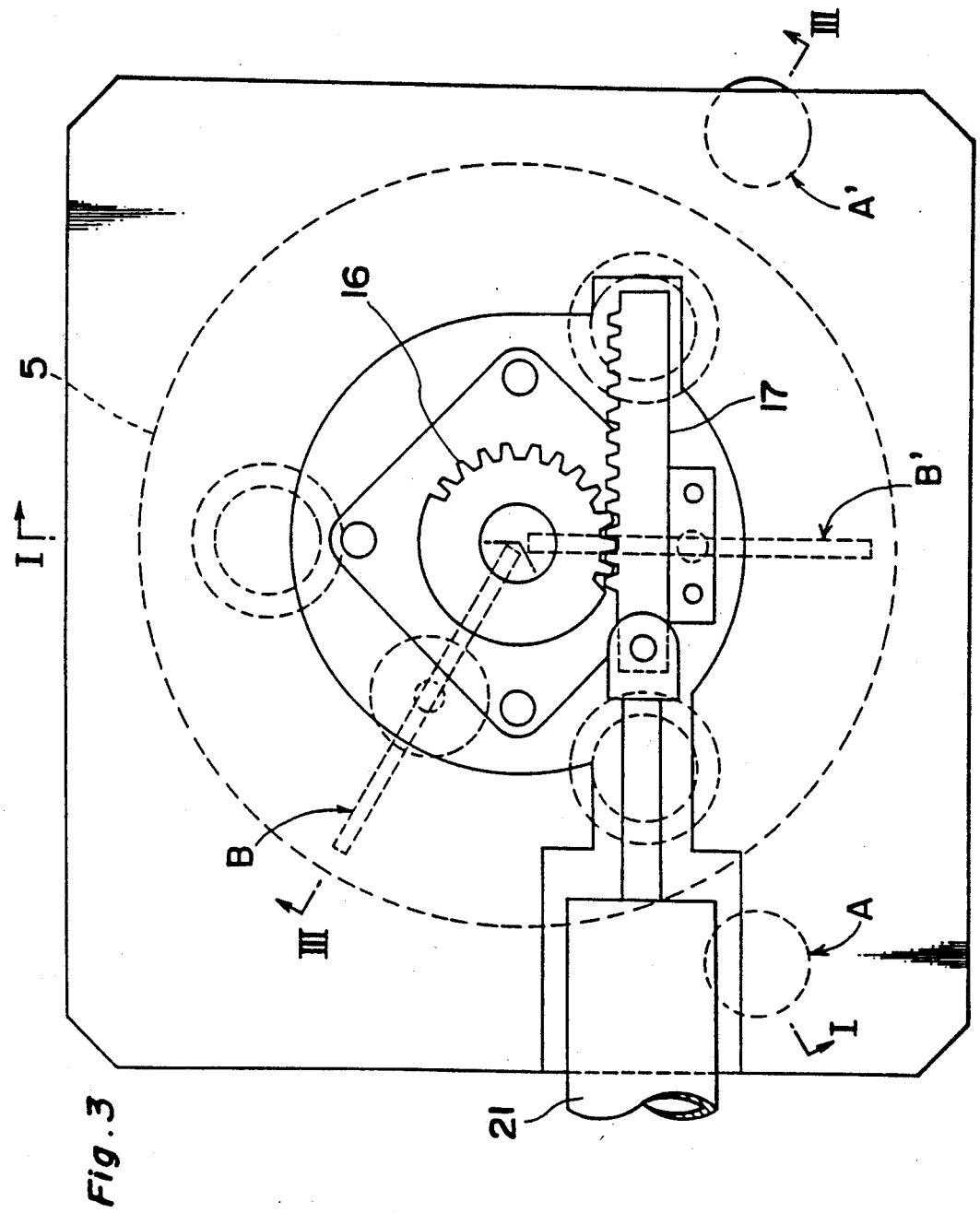

As shown in FIG. 3, the rack 17 engaging the pinion 16 is connected with an actuator 21 and is driven to and fro in a horizontal direction. When the actuator 21 is activated and, thereby, the rack 17 is moved in one horizontal direction, the pinion 16 is rotated and, accordingly, the rotatable mold 5 is rotated about its center axis.

Figure 4:
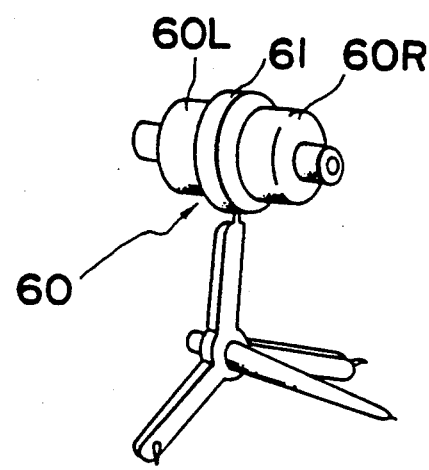
FIG. 4 is a perspective view of a hollow product to be manufactured by the injection molding machine according to the present invention.

FIG. 4 shows an example of a plastic hollow product to be made by the rotational injection molding machine according to the present invention.

This product 60 is comprised of right and left half products 60R and 60L and a ring-like bonding b and 61 which binds open ends of the right and left half products 60R and 60L in a merged state.

Figure 5:
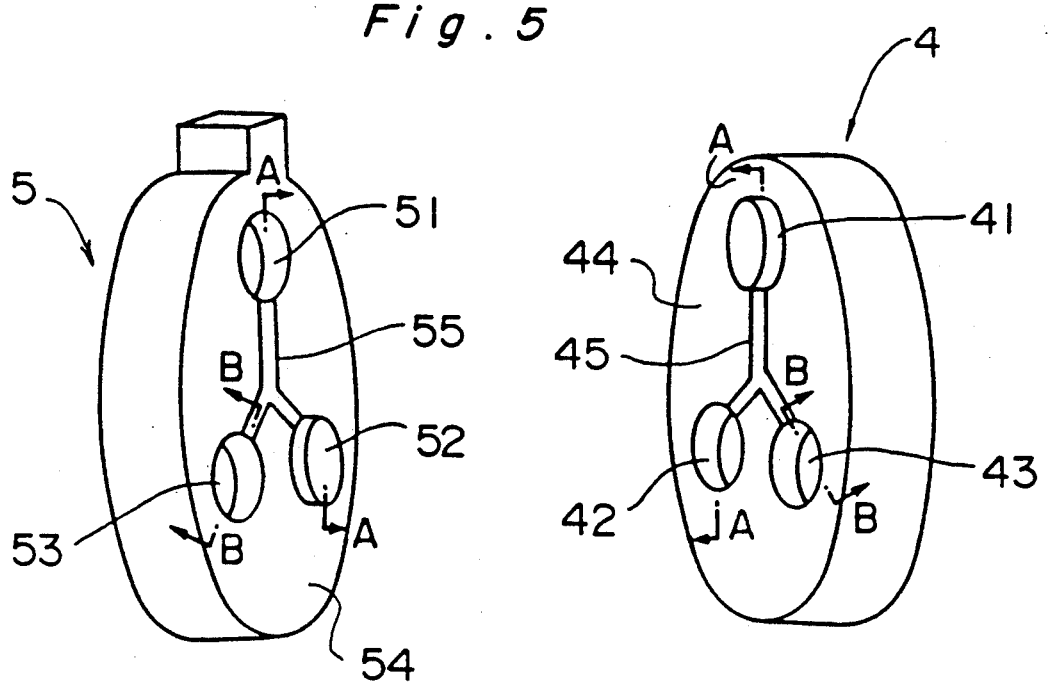
FIG. 5 is a schematic perspective view of the paid of molds according to the preferred embodiment of the present invention.

FIG. 5 shows the rotatable and fixed molds 5 and 4 for forming products as shown in FIG. 4.

Figure 6:
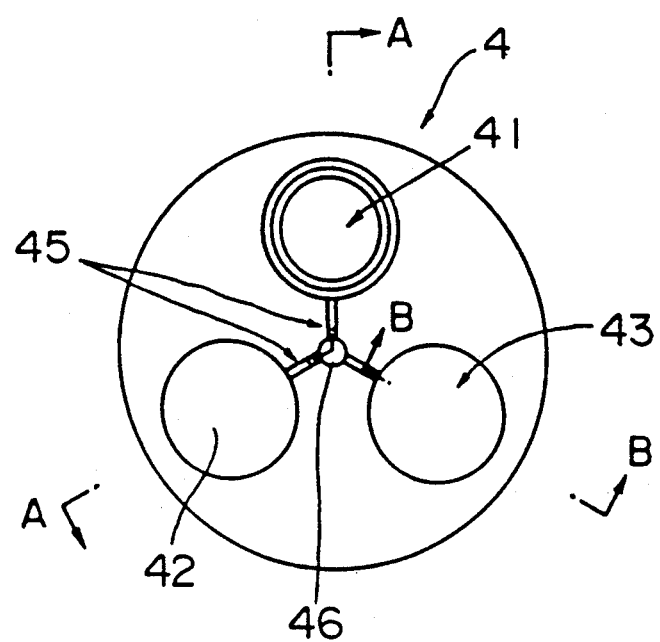
FIG. 6 is a front view of the fixed mold.

The fixed mold 4 is of a circular disk-like configuration and has one male die 41 and two female dies 42 and 43 on its product forming plane 44. These three dies 41, 42, and 43 are arranged at an equal distance from and at an equal angle (120°) about the center axis of the fixed mold 4. The rotatable mold 5 also has a substantially same configuration as the fixed mold 4 and, on its product forming plane 54, there are formed two female dies 51 and 53 and one male die 52 at an equal distance from and at an equal angle (120°) about the center axis thereof. The distance of each die of the fixed mold 4 is set equal to that of each die of the rotatable mold 5. Three dies 41, 42 and 43 of the fixed mold 4 are connected by a radial runner channel 45 formed on the product forming plane 44 and, also, three dies 51, 52 and 53 of the rotatable mold 5 are connected by a radial runner channel 55. As shown in FIG. 6, the radial runner channel 45 is connected to a sprue 56 formed passing through the center of the fixed mold 4.

Next, the manufacturing process of hollow products according to the present invention is explained.

Figure 7A:
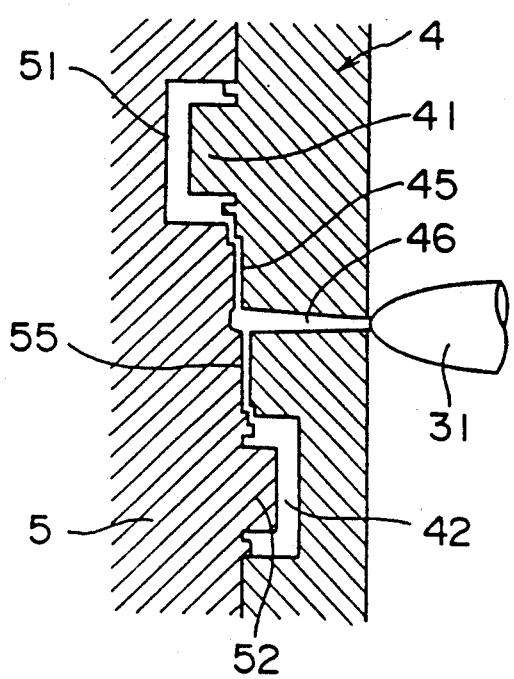
FIGS. 7(a) and 7(b) are partial cross-sectional views of the pair of molds in a clamped state along A—A and B—B lines of FIG. 5, respectively.
Figure 7B:
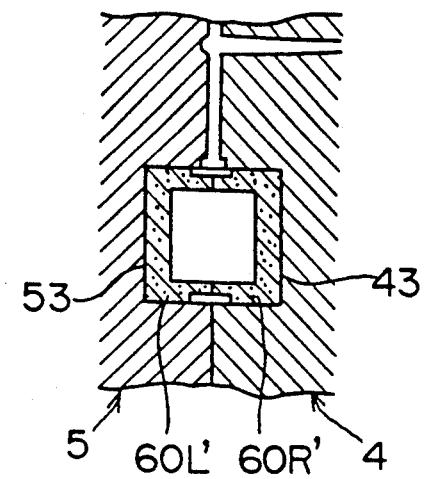

FIG. 7(a) and 7(b) are partial cross-sectional views along A—A and B—B lines indicated in FIG. 5 when the rotatable mold 5 is clamped to the fixed mold 4 while maintaining relative rotational petitions of the both molds 4 and 5 as shown in FIG. 5.

As shown in FIG. 7(a), in this first stage, the male die 41 fits into the female die 51 so as to be able to mold a left product 60L and the male die 52 fits into the female die 42 so as to be able to mold a right half product 60R.

The remaining female dies 43 and 53 coincide with each other wherein dummy half products 60R' and 60L' having been molded beforehand are inserted upon starting the molding operation. After clamping the rotatable mold 5 to the fixed mold 4 tightly, molten resin is injected into cavities formed between the both molds 4 and 5 from the injection nozzle 31 through the sprue 46.

Figure 8A:
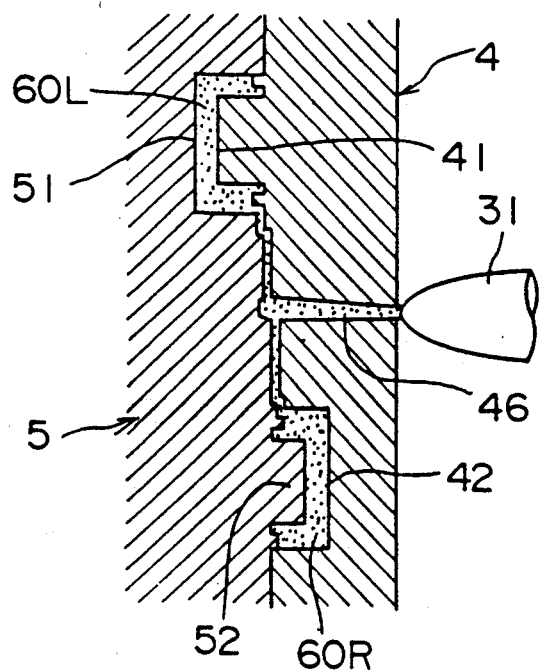
FIGS. 8(a) and 8(b) are partial cross-sectional views similar to FIGS. 8(a) and 8(b) for showing primary and secondary injection moldings.
Figure 8B:
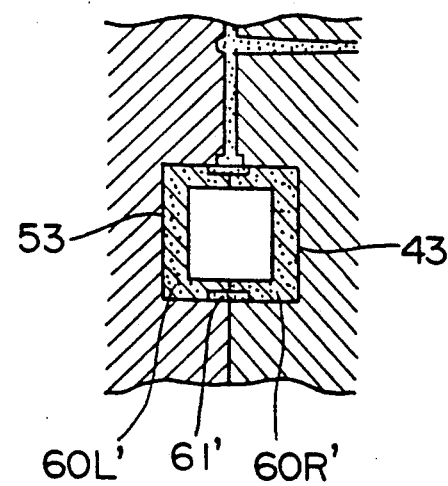

As shown in FIGS. 8(a) and 8(b), one left half product 60L is molded in the cavity defined between the male die 41 and the female die 51 and one right half product 60R is molded in the cavity defined between the female die 42 and the male die 52. As shown in FIG. 8(b), dummy half products 60R' and 60L' are merged into one piece by an annular connecting band 61' formed by a resin filled into an annular cavity formed around the abutted open ends of the dummy right and left half products 60R' and 60L'.

Figure 9A:
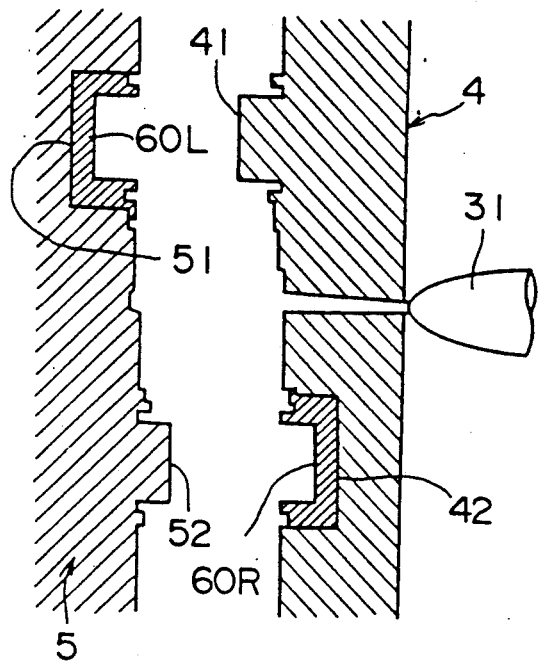
FIGS. 9(a) and 9(b) are partial cross-sectional views for showing an opened state of the pair of molds.

FIG. 9(a) shows the left and right half products 60L and 60R thus molded and the connection band 61' after during, the rotatable mold 5 is opened relative to the fixed mold 4 while holding the left and right half products 60L and 60R in the female dies 51 and 42, respectively.

Figure 9B:
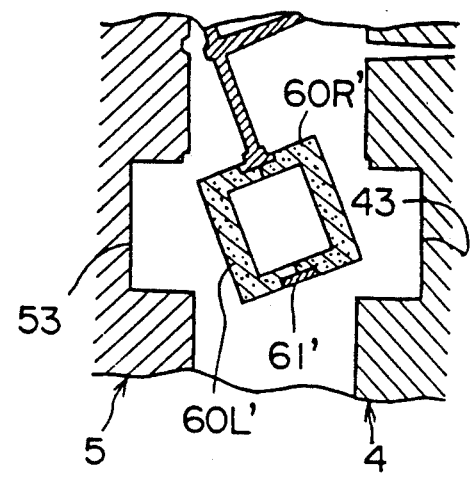

As shown in FIG. 9(b), the dummy half products 60R' and 60L' merged by the connection band 61' are dropped down together with a runner formed.

Figure 10:
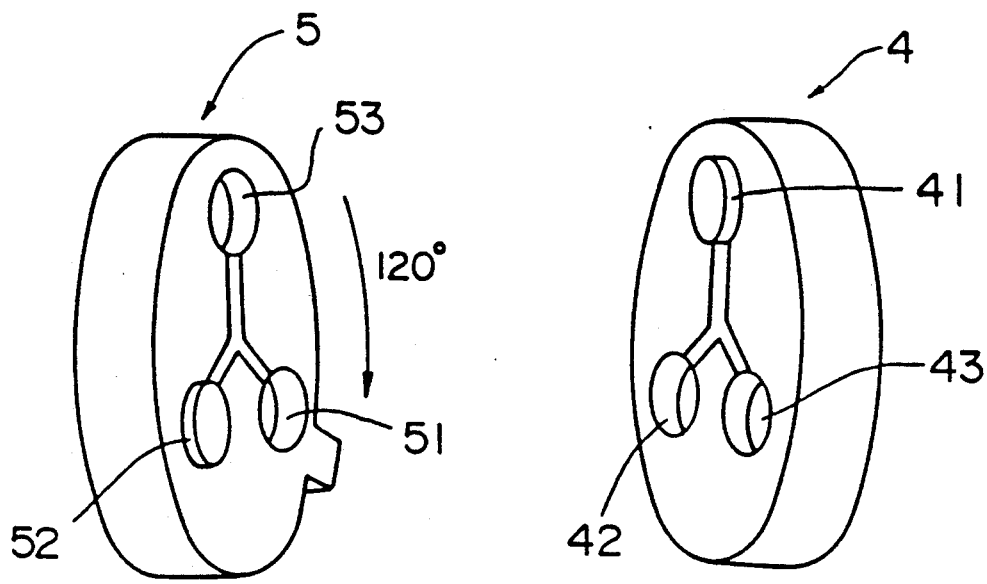
FIG. 10 is a schematical perspective view of the pair of molds for showing rotation of the rotatable mold.

Next, as shown in FIG. 10, the rotatable mold 5 is rotated by 120° by operating the actuator 21 in an opened state. Thereafter, the rotatable mold 5 is clamped to the fixed mold 4.

In this second stage, the male die 41, the female die 42 and the female die 43 of the fixed mold 4 correspond to the female die 53, the female 51 and the male die 52 of the rotatable mold 5, respectively.

Figure 11A:
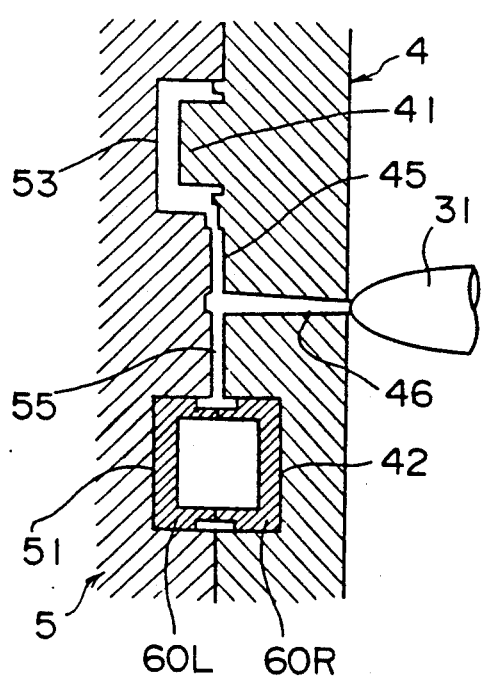
FIGS. 11(a) and 11(b) are partial cross-sectional views of the pair of molds in a state clamped again after rotation of the rotatable mold.
Figure 11B:
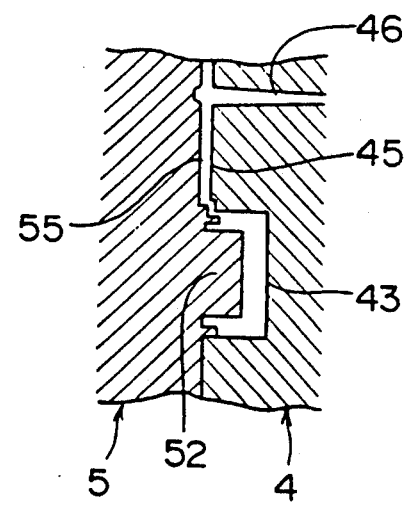

Accordingly, as shown in FIGS. 11(a) and 11(b), there is formed a cavity for molding a left half product between the male die 41 and the female die 53 and a cavity for molding a right half product is defined between the female die 43 and the male die 52.

On the other hand, the right and left half products 60R and 60L having been molded in the first stage are abutted in a state held in the female dies 42 and 51, respectively and, thereby, an annular cavity is formed around outer peripheries of the abutted ends, as shown in the lower portion of FIG. 11(a).

Figure 12A:
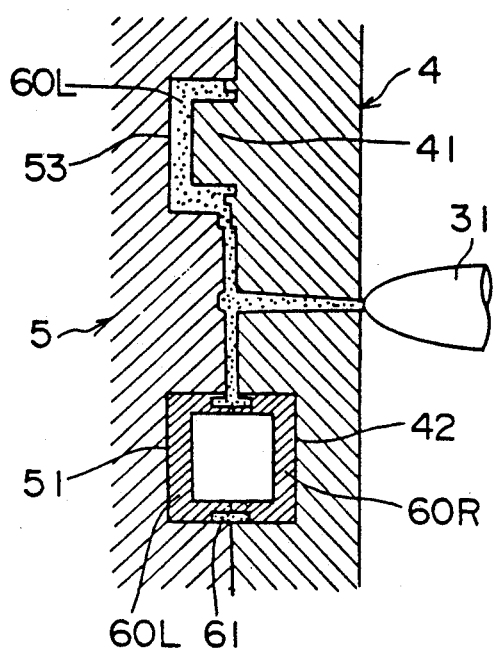
FIGS. 12(a) and 12(b) are partial cross-sectional views of the pair of molds in an injection state.
Figure 12B:
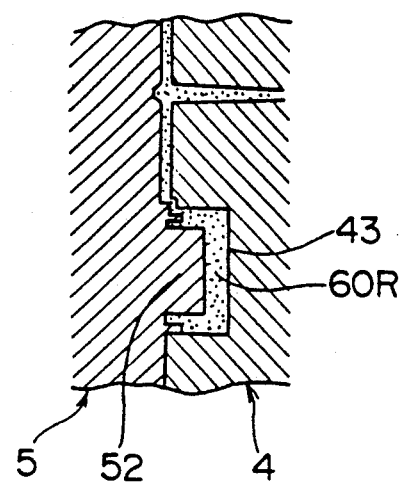
Figure 13A:
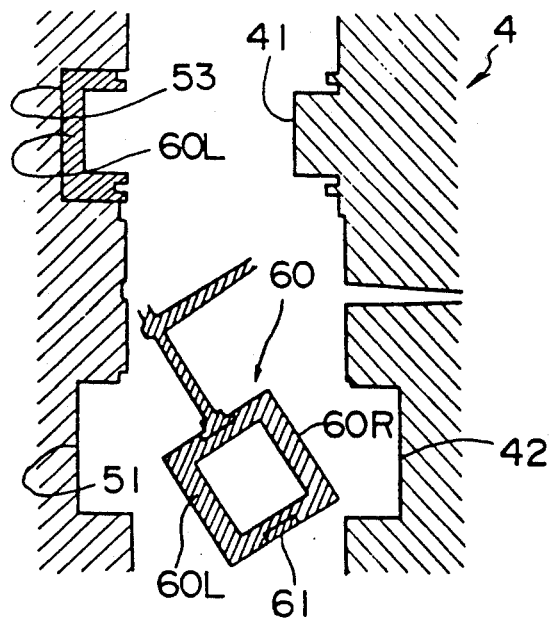
FIGS. 13(a) and 13(b) are partial cross-sectional views of the pair of molds in an opened state.
Figure 13B:
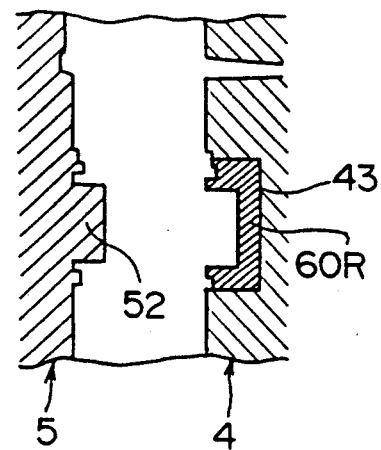

When molten resin is injected from the nozzle 31 in this state, as shown in FIGS. 12(a) and 12(b), new left and right half products 60L and 60R and one new product 60 comprising the left and right half products 60L and 60R connected or merged by the connection band 61 are molded simultaneously. Thereafter, when the rotatable mold 5 is opened from the fixed mold 4, as shown in FIGS. 13(a) and 13(b), the new hollow product 60 is ejected from the mold together with a runner, while holding the left and right half products 60L and 60R in the female dies 53 and 42, respectively. Then, the runner is removed to obtain the hollow product 60 finally.

Figure 14:
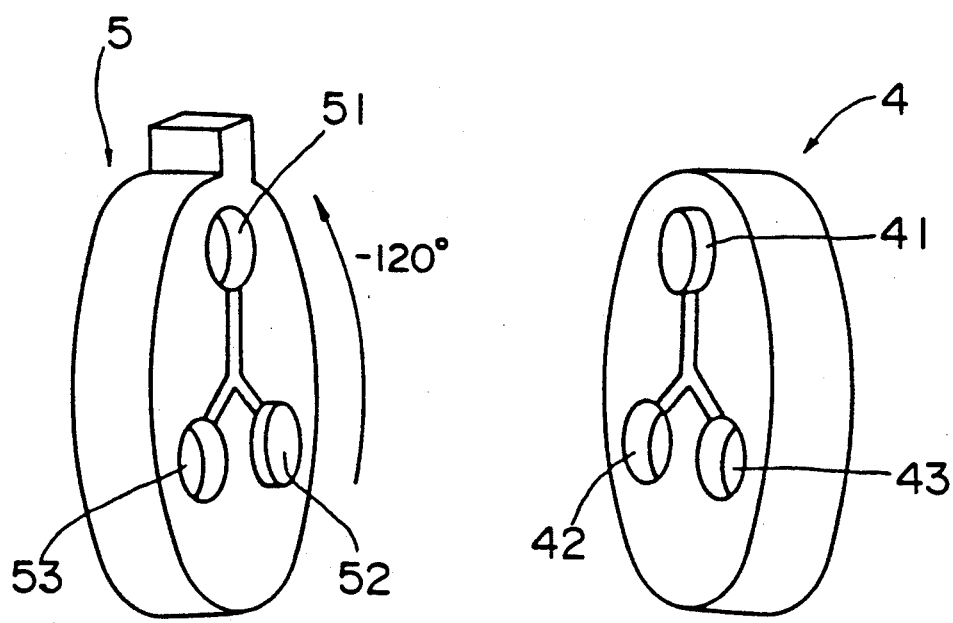
FIG. 14 is a schematic perspective view of the pair of molds in an opened state for showing rotation of the rotatable mold back to the first position.

When the rotatable mold 5 is fully opened, it is rotated in a reverse direction by 120°, as shown in FIG. 14 which is equivalent to FIG. 5. And, thereafter, it is clamped to the fixed mold 4 again. However, in this stage, the situation is different from that shown in FIGS. 7(a) and 7(b) wherein the dummy right and left half products 60R' and 60L' are used since real right and left half products 60R and 60L have been molded in the foregoing molding process.

As is apparent from the above, by repeating the above molding processes, it becomes possible to mold hollow products continuously without any idle die. This greatly enhances the efficiency of the manufacturing. Further, it is to be noted that the amount of injection is always constant and, thereby, control of the injection amount is very simplified to give a high accuracy.

Figure 15A:
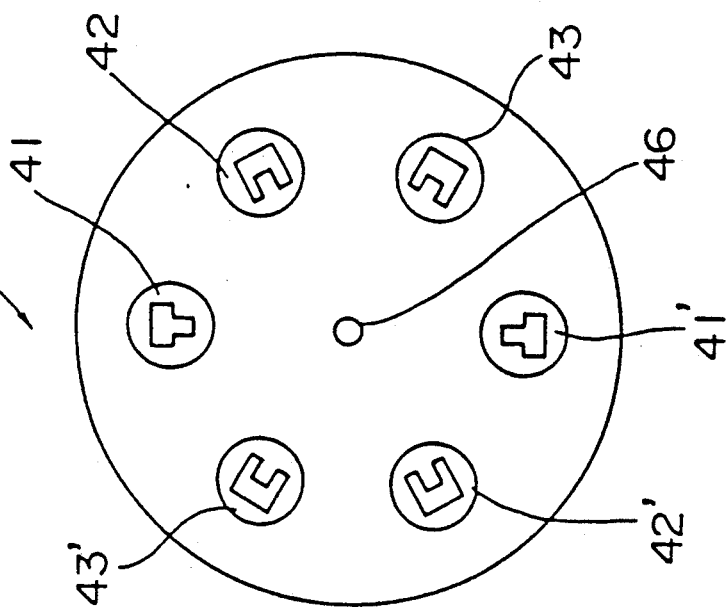
FIG. 15 shows schematic front views of a pair of molds for showing a variation of the preferred embodiment of the present invention.
Figure 15B:
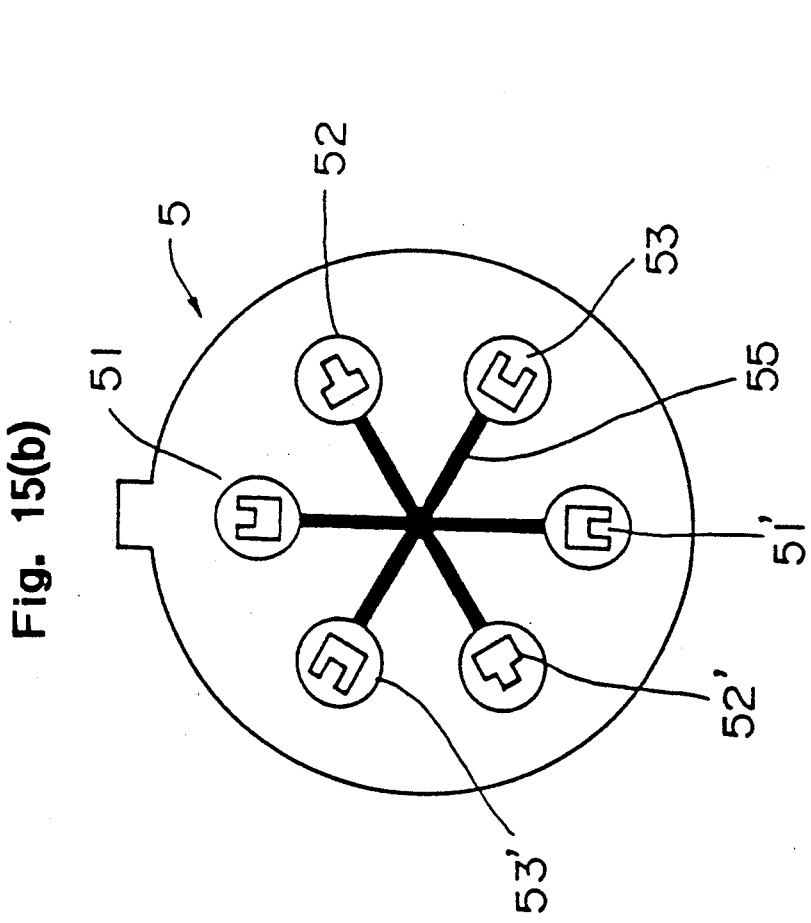

Although one male die and two female dies are arranged at an equal angle pitch of 120° in the above preferred embodiment, it is also possible to employ such a structure schematically shown in FIG. 15 wherein male and female dies are indicated by marks and symbolically.

In this case, six dies are arranged at an equal angle pitch of 60° and, by repeating a reciprocal rotation by 60°, two hollow products can be molded at one time, as is easily understood from the foregoing preferred embodiment.

Figure 16:
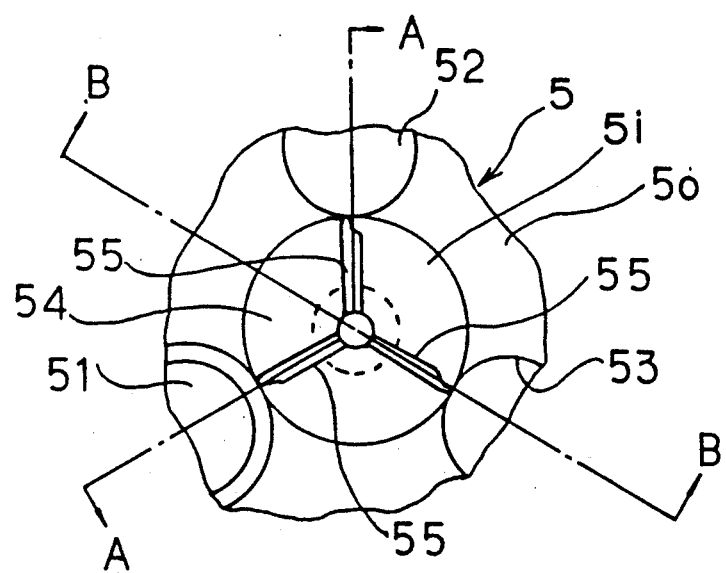
FIG. 16 is a partial front view of the rotatable mold according to another preferred embodiment of the present invention.
Figure 17:
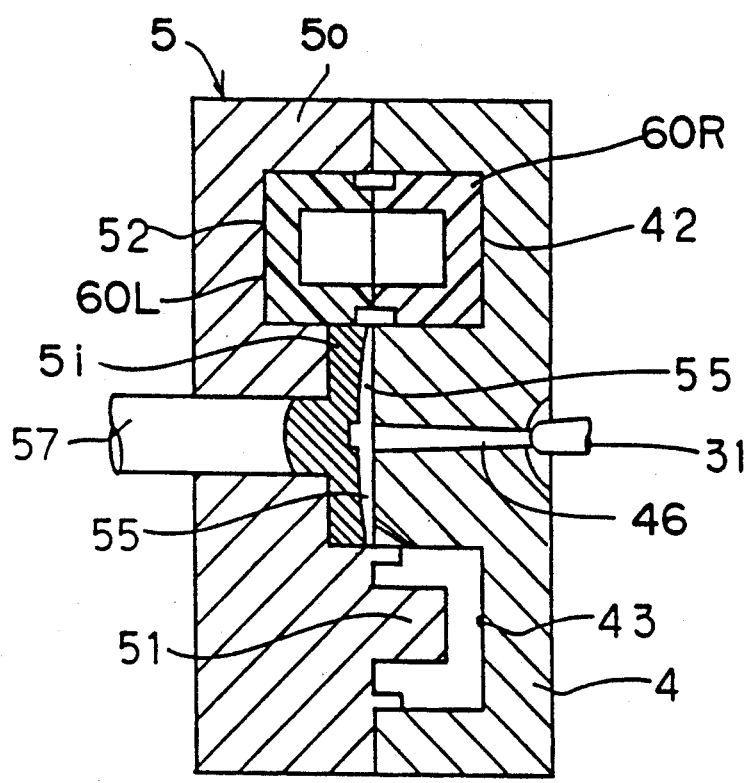
FIG. 17 is a cross-sectional view of the rotatable mold along A—A line of FIG. 16.

With respect to the rotatable mold 5, it is desirable to have an inner disk 5i rotatable relative to an outer 50, as shown in FIGS. 16 and 17. The outer periphery of the inner disk 5i is a circle inscribing male and female dies 51, 52 and 53 and, on the end surface thereof, three runner channels 55 are formed from the center to respective dies radially, as shown in FIG. 16.

Figure 18:
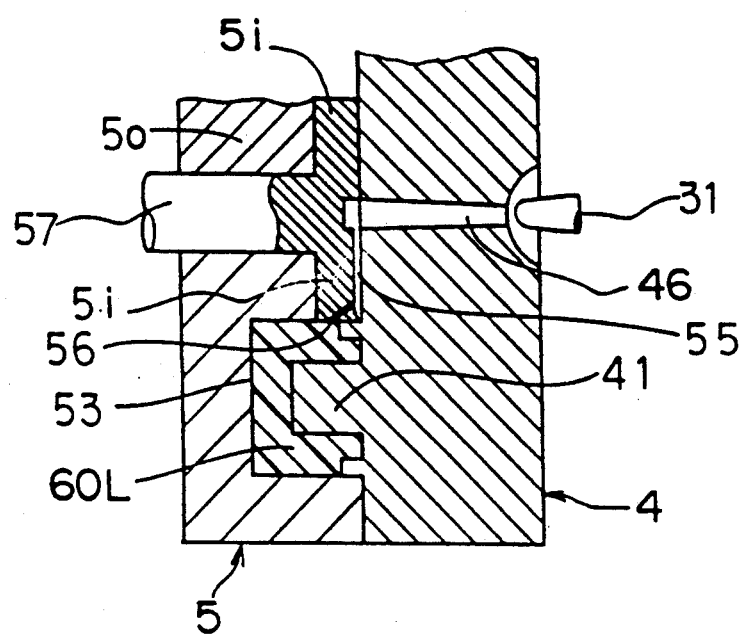
FIG. 18 is a cross-sectional view of the rotatable mold along B—B line of FIG. 16.

As shown in FIG. 17 and 18, the inner disk 5i is supported by a rotation shaft 57 at its center and, by rotating the shaft 57 by a suitable driving means (not shown), it is rotated relative to the main body of the rotatable mold 5 and, thereby, gate portions formed upon molding are easily cut off. The inner disk 5i can be rotated before or upon opening the rotatable mold 5 by the driving means therefor automatically.

Figure 19:
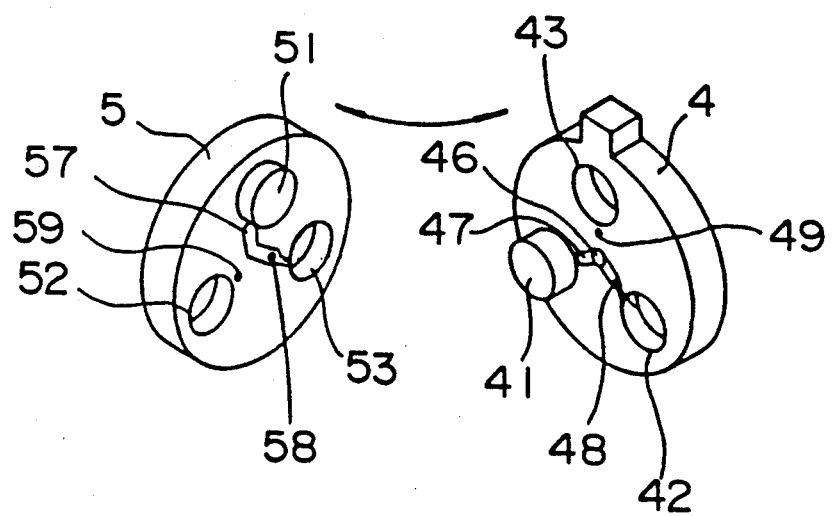
FIG. 19 is a perspective view of a pair of molds in an open state for showing a runner and gate structure according to a further preferred embodiment of the present invention.

FIG. 19 shows a desirable runner and gate structure to be formed on respective product forming planes of the fixed and rotatable molds 4 and 5.

Each mold 4 or 5 has a runner channel 47 or 57 having an angled configuration and two submarine gates 48 and 49 or 59 and 59.

Figure 20:
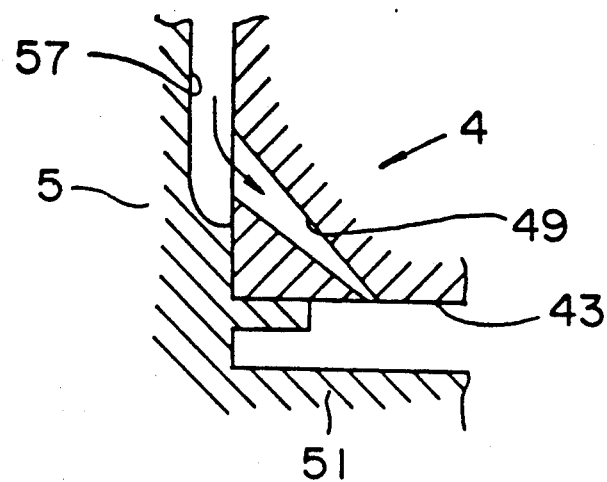
FIGS. 20, 21 and 22 are enlarged partial cross-sectional views for showing supplying paths of molten resin, respectively.
Figure 21:
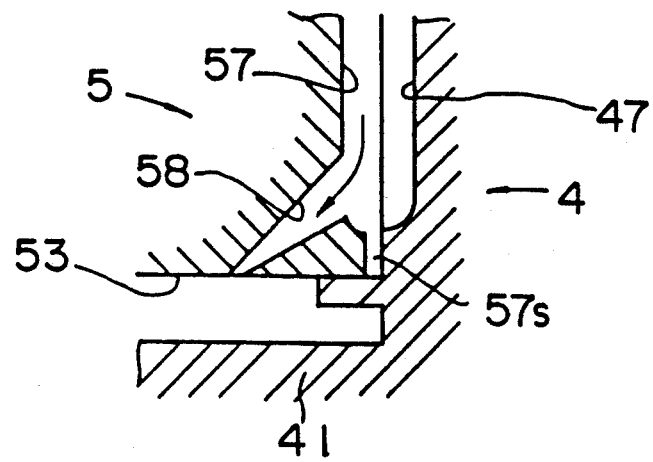

One end of each runner channel 47 or 57 directed to the male die 41 or 51 terminates before the male die 41 or 51, as shown in FIGS. 20 or 21. The other end of each runner channel 47 or 57 directed to the female die 42 or 53 is connected thereto through side gate 47s or 57s and submarine gate 48 or 58 which is tapered inwardly, as shown in FIGS. 21 and 22.

FIG. 20 shows a state for molding a right half product in a cavity defined by the female die 43 and the male die 51. In this state, molten resin is supplied into the cavity by the submarine gate 49 connected to one end of the runner channel 57.

FIG. 21 shows a state for molding a left half product in a cavity defined by the male die 41 and the female die 53. In this state, the other ends of the runner channels 47 and 57 coincide with each other and molten resin is supplied into the cavity through the submarine gate 58 connected to the other end of the runner channel 57. The side gate 57s thereof is closed by the male die 41.

Figure 22:
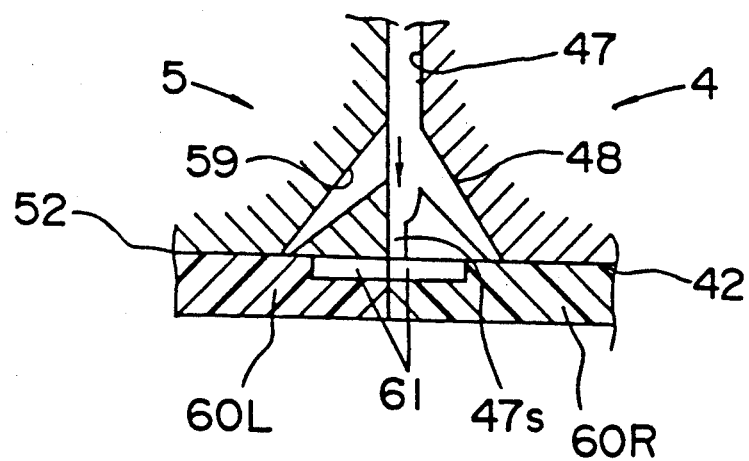

FIG. 22 shows a state for connecting the right and left half products 60R and 60L into one piece. In this stage, molten resin is supplied to an annular cavity defined by the abutted right and left half products and two female dies 42 and 52 through the side gate 47s.

Thus, molten resin is surely supplied to all molding cavities formed between the fixed and rotatable molds 4 and 5.

As is easily understood from the above mentioned, even if the rotatable mold 5 is rotated by 120° about its center, molten resin is smoothly supplied to all cavities formed between both molds 4 and 5 in this molding stage.

The runner and gate structure mentioned above is advantageous in that the volume of resin to be cast away as waste material such as runner portions can be minimized.

Figure 23:
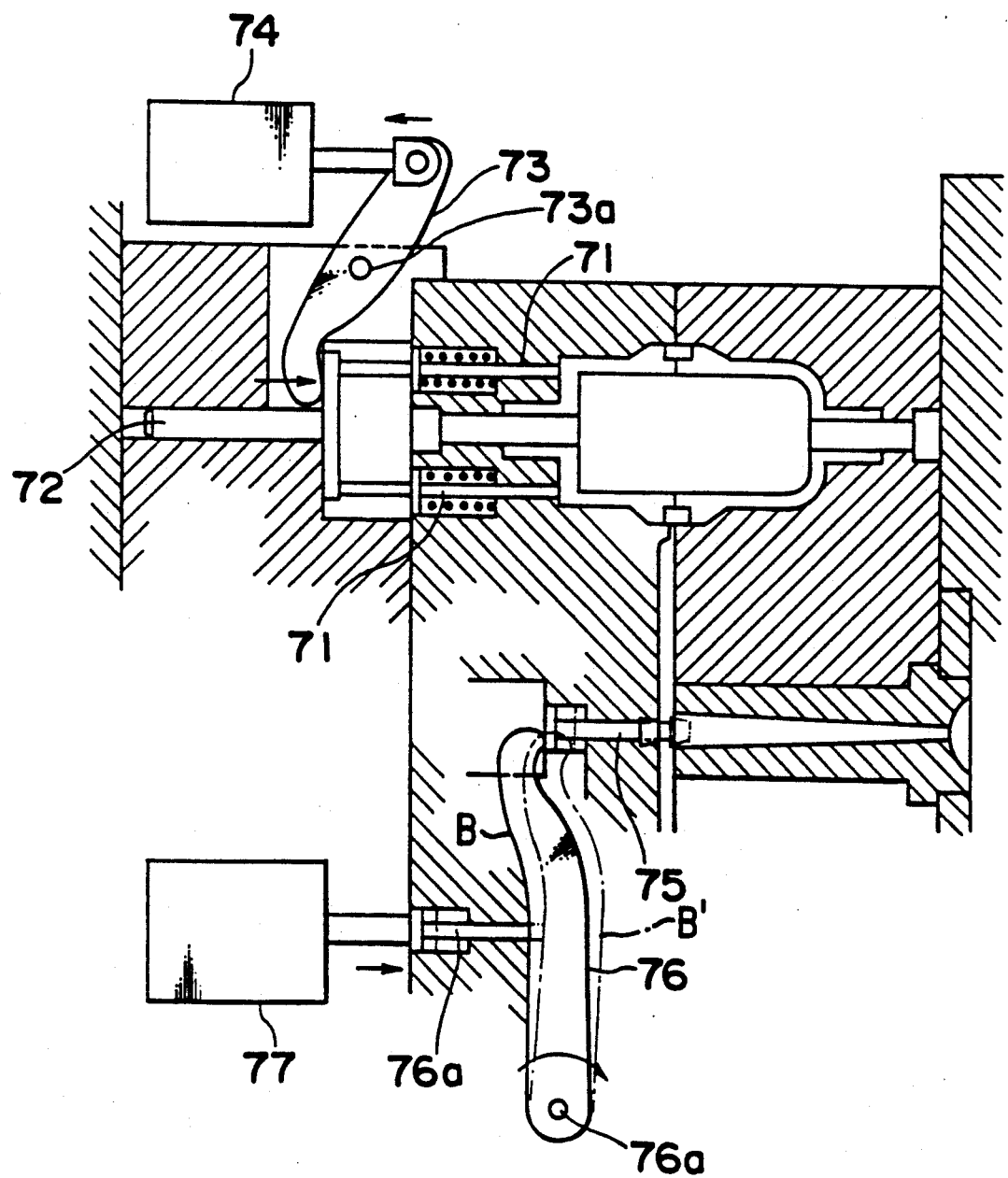
FIG. 23 is a cross sectional view of the pair of molds for showing an ejection mechanism according to the present invention.

Next, an ejector mechanism is explained referring to FIG. 3 and FIG. 23.

As shown in FIG. 23 the ejector mechanism has a first ejector for ejecting a product molded and a second ejector for ejecting a runner portion including a sprue portion formed simultaneously.

The first ejector is comprised of a pair of ejector pins 71, a push rod 72 for pushing out the pair of ejector pins 71, a lever means 73 for operating the push rod 72 and an actuator 74 for operating the lever means 73. The pair of ejector pins 71 are biased by coil springs in a direction opposite to that of ejection so as for each end of the ejector pins 71 to form a bottom surface of a female die usually and the push rod 72 is maintained thereby at a waiting position shown. Upon ejecting the product, the actuator 74 is activated to swing the lever means 73 around a hinge axis 73a in a direction indicated by an arrow and the free end thereof pushes the push rod 72 to eject the product by the pair of ejector pins 71.

This first ejector is arranged at each of two positions indicated by A and A' in FIG. 3 where products are molded reciprocally.

The second ejector is comprised of an ejector pin 75 arranged along the center axis of the rotatable mold 4, a lever means 76 for pushing the ejection pin 75 by the free end thereof and an actuator 77 for operating the lever means 76 which is arranged in the mounting plate 9.

Upon ejecting runner and sprue portions, the actuator 77 is activated to swing the lever means 76 about a hinge axis 76a by pushing a pin 76b fixed to an intermediate portion thereof and, thereby, the lever means 76 pushes out the ejector pin 75 eject the runner and sprue portions to be cast.

With respect to the second ejector, two lever means 76 are arranged at two positions as indicated by dotted lines B and B' but only one actuator 77 is needed for operating either one of two lever means according to the rotational position of the rotatable mold 5.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An injection molding machine for forming hollow plastic products comprising:
    a pair of molds;
    an injection means for injecting a molten resin into one or more cavities formed between said pair of molds;
    clamp means for clamping and opening one of said pair of molds to the other mold upon injection molding, wherein at least one of said molds in each pair of molds is rotatably supported about a center thereof by a support means;
    wherein each of said pair of molds includes at least one male die and two female dies arranged on each product molding plane thereof at an equal distance from and an equal angular pitch about the center axis thereof; and
    wherein a rotation means is provided for reciprocatingly rotating said rotatable mold about said center thereof between two angular positions whereat each of said male dies of said pair of molds engages with either one of said two female dies of the other mold and the remaining female dies mate with each other.

2. An injection molding machine as in claim 1, wherein said center about which said at least one mold is rotated is parallel to a direction in which said molds open.

3. An injection molding machine as in claim 1, wherein each pair of molds includes a rotatable mold and a fixed mold.

4. An injection molding machine as in claim 3, wherein said clamp means includes a movable platen coupled to said rotatable mold via a mounting plate, wherein said movable platen is movably guided via a plurality of guide rods.

5. An injection molding machine as in claim 1, wherein said rotation means includes a rack and pinion connected to said support means.

* * * * *